(12) United States Patent
Pearce et al.

(10) Patent No.: US 8,532,942 B2
(45) Date of Patent: Sep. 10, 2013

(54) MONITORING SYSTEM FOR WELL CASING

(75) Inventors: Jeremiah Glen Pearce, Houston, TX (US); Frederick Henry Kreisler Rambow, Houston, TX (US)

(73) Assignee: Shell Oil Company, Houston, TX (US)

( * ) Notice: Subject to any disclaimer, the term of this patent is extended or adjusted under 35 U.S.C. 154(b) by 203 days.

(21) Appl. No.: 12/921,968

(22) PCT Filed: Mar. 10, 2009

(86) PCT No.: PCT/US2009/036646
§ 371 (c)(1),
(2), (4) Date: Nov. 17, 2010

(87) PCT Pub. No.: WO2009/114519
PCT Pub. Date: Sep. 17, 2009

(65) Prior Publication Data
US 2011/0054808 A1    Mar. 3, 2011

Related U.S. Application Data

(60) Provisional application No. 61/035,822, filed on Mar. 12, 2008.

(51) Int. Cl.
*G01B 11/16* (2006.01)
(52) U.S. Cl.
USPC .......................................................... 702/42
(58) Field of Classification Search
USPC .......................................................... 702/42
See application file for complete search history.

(56) References Cited

U.S. PATENT DOCUMENTS

| | | | |
|---|---|---|---|
| 4,599,904 A * | 7/1986 | Fontenot | 73/783 |
| 6,580,033 B1 | 6/2003 | Goldner et al. | 174/72 |
| 6,854,327 B2 | 2/2005 | Rambow et al. | 73/250 |
| 7,121,342 B2 | 10/2006 | Vinegar et al. | 166/302 |
| 7,245,791 B2 | 7/2007 | Rambow et al. | 385/12 |
| 7,357,180 B2 | 4/2008 | Vinegar et al. | 166/254.1 |
| 7,409,858 B2 | 8/2008 | Dria et al. | 73/152.33 |
| 2002/0158866 A1 | 10/2002 | Batchko | 345/419 |
| 2003/0007442 A1 | 1/2003 | Henrichs | 369/95 |
| 2004/0140095 A1 | 7/2004 | Vinegar et al. | 166/302 |
| 2004/0140096 A1 | 7/2004 | Sandberg et al. | 166/302 |
| 2004/0144540 A1 | 7/2004 | Sandberg et al. | 166/302 |
| 2004/0144541 A1 | 7/2004 | Picha et al. | 166/302 |
| 2004/0145969 A1 | 7/2004 | Bai et al. | 367/37 |

(Continued)

FOREIGN PATENT DOCUMENTS

| DE | 19913113 | 10/2000 |
|---|---|---|
| GB | 1570511 | 7/1980 |

OTHER PUBLICATIONS

William C. Lyons, mathematics general engineering and science, p. 985-1431, 1996.*
Kevin M. Lynch, Sensors, 152 pages, 2002 CRC Press LLC.*

*Primary Examiner* — Tung S Lau (57) ABSTRACT

A system (20) for monitoring deformation of a substantially cylindrical casing (14). The system (20) includes at least two strings (22) of interconnected sensors (24) that are wrapped around the casing (14) so as not to intersect one another. At least one of the strings (22) includes a series of at least two segments (S). The series of segments (S) includes a segment (S) arranged at one wrap angle (θ) and another segment (S) arranged at a different wrap angle (θ).

3 Claims, 10 Drawing Sheets

(56) References Cited

U.S. PATENT DOCUMENTS

| | | | |
|---|---|---|---|
| 2004/0146288 A1 | 7/2004 | Vinegar et al. | 392/301 |
| 2004/0168794 A1 | 9/2004 | Vold | 166/65.1 |
| 2004/0177966 A1 | 9/2004 | Vinegar et al. | 166/302 |
| 2004/0179841 A1 | 9/2004 | Shahar | 398/75 |
| 2005/0006097 A1 | 1/2005 | Sandberg et al. | 166/302 |
| 2005/0051327 A1 | 3/2005 | Vinegar et al. | 166/256 |
| 2005/0215764 A1 | 9/2005 | Tuszynski et al. | 530/358 |
| 2005/0274194 A1 | 12/2005 | Skinner et al. | 73/736 |
| 2006/0045408 A1 | 3/2006 | Jones et al. | 385/12 |
| 2006/0233482 A1 | 10/2006 | Rambow | 385/12 |
| 2007/0068262 A1 | 3/2007 | Skinner et al. | 73/705 |
| 2007/0131411 A1 | 6/2007 | Vinegar et al. | 166/59 |
| 2008/0047662 A1* | 2/2008 | Dria et al. | 156/249 |
| 2009/0296086 A1 | 12/2009 | Appel et al. | 356/326 |
| 2010/0200743 A1 | 8/2010 | Forster et al. | 250/254 |
| 2010/0200744 A1 | 8/2010 | Pearce et al. | 250/268 |
| 2010/0254650 A1 | 10/2010 | Rambow | 385/13 |

* cited by examiner

MONITORING SYSTEM FOR WELL CASING

PRIORITY CLAIM

The present application claims priority from PCT/US2009/036646, filed 10 Mar. 2009, which claims priority from U.S. provisional application 61/035,822, filed 12 Mar. 2008, which is incorporated herein by reference.

TECHNICAL FIELD

This invention relates generally to systems and methods for detecting deformation of a casing of a well in a formation and, more specifically, to a system that includes strings of interconnected strain sensors.

BACKGROUND

Electromagnetic investigation tools are often used to take measurements at points along the length of a borehole in an earth formation. Wells in formations are commonly reinforced with casings that prevent the wells from collapsing. However, forces applied by the formation may cause the casing to bend, buckle, or otherwise deform. Where the deformation results in a significant misalignment of the well axis, the production that can be gained from the well can may be partially or completely lost. In either case, additional time and expense is necessary to repair or replace the well.

The ability to detect an early stage of deformation would allow for changes in production practices and remedial action.

SUMMARY

The present disclosure provides a system and method for detecting deformation of a casing in a formation. The system includes non intersecting strings of interconnected sensors such that the risk of damage is reduced. The strings are arranged to facilitate qualitative and/or quantitative analysis of data from the interconnected sensors.

According to an exemplary embodiment, a system for monitoring deformation of a substantially cylindrical casing includes at least two strings of interconnected sensors. The strings are wrapped around the casing so as not to intersect one another. The strings include a first string that includes a first series of at least two segments. The first series of at least two segments includes a first segment arranged at a first angle with respect the casing axis and a second segment arranged at a second angle with respect to the casing axis.

In certain embodiments, first series of at least two segments further includes a third segment arranged at a third angle. In certain embodiments, the strings include a second string that is arranged at a substantially constant third angle. In certain embodiments, the segments extend for arc distances that are at least half of the circumference of the casing.

Grooves are formed in the casing and the strings are at least partially recessed in the grooves.

The system further includes a data acquisition unit and a computing unit for collecting and processing data measured at the sensors. In certain embodiments, at least one of the interconnected sensors measures strain. In certain embodiments, at least one of the interconnected sensors measures temperature.

According to one aspect of the disclosure, the strings include a second string that includes a second series of at least two segments. The second series of at least two segments includes a third segment that is arranged at a third angle with respect the casing axis and a fourth segment arranged at a fourth angle with respect to the casing axis.

In certain embodiments, the first series of at least two segments is substantially the same as the second series of at least two segments. According to an exemplary embodiment, axial distances of the segments are substantially equal to one another. In such embodiments, the first string and the second string can be positioned relative to one another such that segments that have different wrap angles are represented within distance intervals along the axial length of the casing. According to another exemplary embodiment, arc distances of the segments are substantially equal to one another. In such embodiments, the first string and the second string can be positioned relative to one another such that segments that have the same wrap angle are represented within distance intervals along the axial length of the casing.

According to another aspect of the disclosure, the strings include optical fibers and the sensors include periodically written wavelength reflectors. In certain embodiments, the wavelength reflectors are reflective gratings such as fiber Bragg gratings.

In such embodiments, strings provide a wavelength response that includes reflected wavelengths corresponding to sensors. Each reflected wavelength is substantially equal to the sum of a Bragg wavelength and a change in wavelength. The change in wavelength corresponds to a strain measurement.

Strings can be arranged such that subsets of the wavelength responses can be grouped according to wrap angle and such that at least one of the grouped subsets includes substantially continuous measurements along the longitudinal axis of the casing. Strings can also be arranged such that subsets of the wavelength responses can be grouped according to wrap angle and such that at least one of the grouped subsets includes substantially continuous measurements along the circumference of the casing.

According to another aspect of the disclosure, a method of imaging deformation of a cylindrical casing includes measuring an amount of strain at a plurality of positions on a casing, determining the deformation of the casing from the strain measurements, and projecting an image of the deformed casing. The strain is measured by receiving signals from at least two strings of interconnected sensors that are wrapped around the casing so as not to intersect one another. At least one of the strings includes a series of at least two segments. The series of at least two segments includes a first segment arranged at a first angle with respect the casing axis and a second angle arranged at a second angle with respect to the casing axis. A memory or computer readable medium includes computer executable instructions for execution of the method.

According to another aspect of the invention, a cylindrical casing includes at least two grooves for receiving at least two strings of interconnected sensors. The grooves are arranged so as not to intersect one another. At least one of the grooves includes a series of at least two segments. The series of at least two segments includes a first segment arranged at a first angle with respect the casing axis and a second segment arranged at a second angle with respect to the casing axis.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Systems and methods are described herein in the context of determining deformation of a well casing. However, the present disclosure is also applicable to other cylindrical objects in a borehole where the systems and methods are used to detect and monitor deformation of the object during production or other non-production operations such as completion, gravel packing, frac packing, production, stimulation, and the like. The cylindrical objects may be in the form of a well bore tubular, a drill pipe, a production tube, a casing tube, a tubular screen, a sand screen, and the like.

The teachings of the present disclosure may also be used in other environments where pipes expand, contract, or bend. Examples of such environments include refineries, gas plants, and pipelines.

Herein, a suffix (a, b, c, etc.) or subscript (1, 2, 3, etc.) is affixed to an element numeral that references like-elements in a general manner so as to differentiate a specific one of the like-elements. For example, groove 30a is a specific one of grooves 30.

Casing

Figure 1:
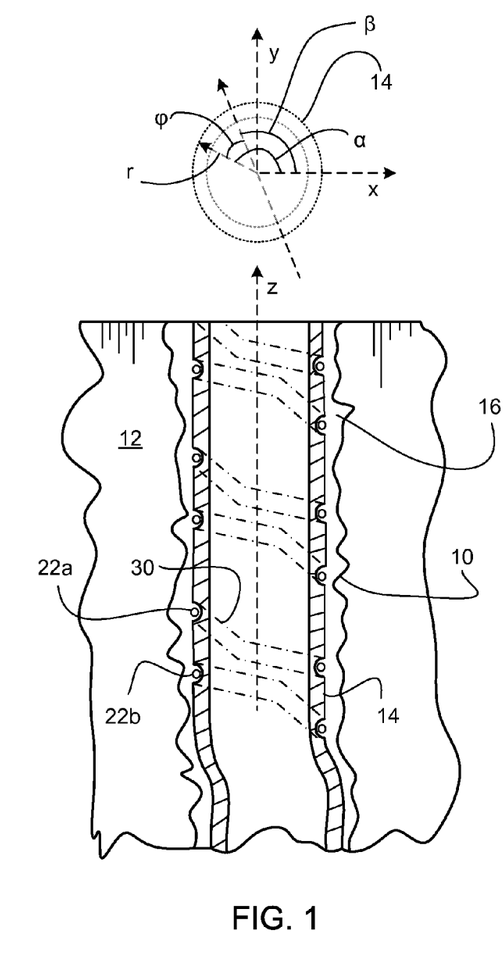
FIG. 1 is a partial cross-sectional view of a well reinforced with a casing.

Referring to FIG. 1, a well 10 is drilled in a formation 12. To prevent well 10 from collapsing or to otherwise line or reinforce the well 10, a casing 14 is formed in well 10. In the exemplary embodiment, casing 14 is formed from steel tubes that are inserted into well 10. Cement is poured between casing 14 and formation 12 to provide a bonded cement sheath 16. However, in alternative embodiments, casing 14 may be formed from other materials and according to alternative methods.

For purposes of teaching, coordinate systems are now described. A Cartesian coordinate system can be used that includes an x axis, a y axis, and a z axis that are orthogonal to one another. The z axis corresponds to the longitudinal axis of casing 14 and any position on casing 14 can be established according to an axial position z and a position in the x-y plane, which is perpendicular to the z axis. In the illustrated embodiment, casing 14 is cylindrical and any position on casing 14 can be established using a Cylindrical coordinate system. Here, the z axis is the same as that of the Cartesian coordinate system and a position lying in the x-y plane is represented by a radius r and a position angle $\alpha$ and referred to as a radial position r$\alpha$. Radius r defines a distance of the radial position r$\alpha$ from the z axis and extends in a direction determined by position angle $\alpha$ to the radial position r$\alpha$. Here, position angle $\alpha$ is measured from the x axis.

A bending direction represents the direction of a bending moment on casing 14. The bending direction is represented by a bending angle $\beta$ that is measured relative to the x axis. A reference angle $\phi$ is measured between bending angle $\beta$ and position angle $\alpha$.

Deformation

Casing 14 may be subject to forces, such as shear forces and compaction forces exerted, for example, by formation 12 or by the inflow of fluid between formation 12 and casing 14. These forces can cause casing 14 to deform. An example of a force F causing deformation of casing 14 is illustrated in FIG. 2.

System

Figure 2:
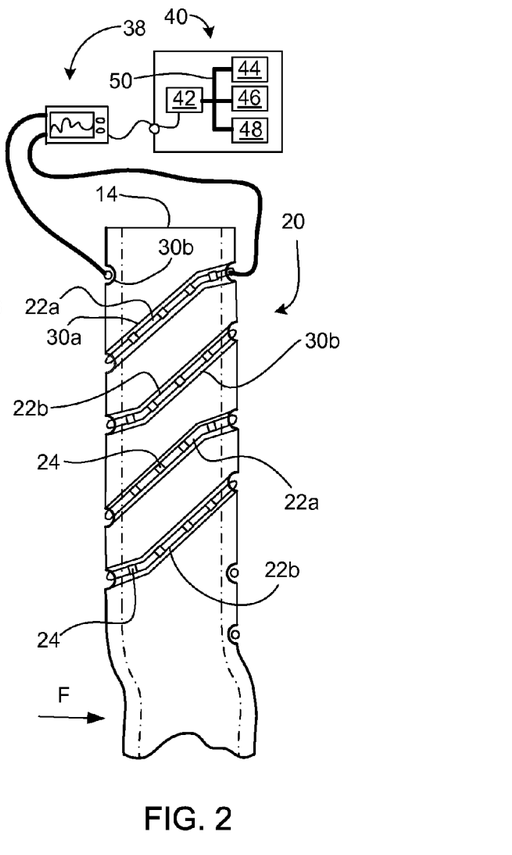
FIG. 2 is a partial side view of the casing of FIG. 1 and a system for measuring deformation of the casing.

Continuing with FIG. 2, casing 14 includes a system 20 for detecting deformation. System 20 includes strings 22 of interconnected strain sensors 24 that are wrapped around casing 14 such that sensors 24 are positioned along the axial length and circumference of casing 14.

System 20 further includes a data acquisition unit 38 and a computing unit 40. Data acquisition unit 38 collects the response at the sensors 24 of each of the strings 22. The response and/or data representative thereof are provided to computing unit 40 to be processed. Computing unit 40 includes computer components including a data acquisition unit interface 42, an operator interface 44, a processor unit 46, a memory 48 for storing information, and a bus 50 that couples various system components including memory 48 to processor unit 46.

Strings of Interconnected Sensors

There are many different suitable types of strings 22 of interconnected sensors 24 that can be associated with system 20. For example, strings 22 can be waveguides such as optical fibers and sensors 24 can be wavelength-specific reflectors such as periodically written fiber Bragg gratings (FBG). An advantage of optical fibers with periodically written fiber Bragg gratings is that fiber Bragg gratings are less sensitive to vibration or heat and consequently are far more reliable. In alternative embodiments, strain sensors 24 can be other types of gratings, semiconductor strain gages, piezoresistors, foil gages, mechanical strain gages, combinations thereof, and the like.

Sensors 24 are not limited to strain sensors. Rather, in certain applications, sensors 24 are temperature sensors.

According to a first exemplary embodiment described herein, strings 22 are optical fibers and sensors 24 are fiber Bragg gratings.

A wavelength response $\lambda_n$ of a string 22 is data representing reflected wavelengths $\lambda_r$ at sensors 24. The reflected wavelengths $\lambda_r$ each represent a fiber strain $\epsilon_f$ measurement at a sensor 24.

Generally described, reflected wavelength $\lambda_r$ is substantially equal to a Bragg wavelength $\lambda_b$ plus a change in wavelength $\Delta\lambda$. Specifically, reflected wavelength $\lambda_r$ is equal to Bragg wavelength $\lambda_b$ when fiber strain $\epsilon_f$ measurement is substantially zero. When fiber strain $\epsilon_f$ measurement is non-zero, reflected wavelength $\lambda_r$ differs from Bragg wavelength $\lambda_b$. The difference is change in wavelength $\Delta\lambda$ and thus change in wavelength $\Delta\lambda$ is the part of reflected wavelength $\lambda_r$ that is associated with fiber strain $\epsilon_f$. Bragg wavelength $\lambda_b$ provides a reference from which change in wavelength $\Delta\lambda$ is measured at each of sensors 24. The relationship between change in wavelength $\Delta\lambda$ and fiber strain $\epsilon_f$ is described in further detail below.

Multiple Strings and Multiple Wrap Angles

In the illustrated embodiments, system 20 includes a plurality of strings 22 and each string 22 winds substantially helically at least partially along the length of casing 14. Certain of strings 20 include a series of segments S that are arranged at different inclinations, hereinafter referred to as wrap angles θ. Typically, the series is at least partially repeated.

In general, wrapping strings 22 at an angle is beneficial in that strings 22 only experience a fraction of the strain experienced by casing 14. Each wrap angle θ is effective for a range of strain. Accordingly, the use of multiple strings 22 with different wrap angles θ expands the overall range of strain that system 20 can measure. For example, a string with a wrap angle of 20° may fail at one level of strain while the same string with a wrap angle of 30° or more may not fail at the same level of strain or at a slightly higher level of strain.

The use of multiple strings 22 with different wrap angles θ facilitates determining Poisson's ratio v, as described in further detail below. Poisson's ratio v may be an undetermined parameter where casing 14 nonelastically deforms or yields under higher strains. For example, where casing 14 is steel, Poisson's ratio v may be near 0.3 while deformation is elastic, but trends toward 0.5 after deformation becomes non-elastic and the material yields.

Another advantage of wrapping casing 14 with multiple strings 22 is that there is added redundancy in case of failure of one of strings 22. The additional data collected with multiple strings 22 makes recovery of a 3-D image an overdetermined problem thereby improving the quality of the image.

Non Intersecting Method of Wrapping Multiple Strings at Multiple Angles

In the illustrated embodiments, strings 22 are arranged so as not to intersect one another. Referring to FIG. 2, grooves 30 are formed in casing 14 and strings 22 are at least partially recessed in grooves 30. As strings 22 are arranged so as to not intersect one another, the depth of grooves 30 is minimized and, accordingly, the effect of grooves 30 on the integrity of casing 14 is minimized. Conversely, were strings 22 to be arranged to intersect, at least part of the depth of grooves 30 would have to be increased at regions of intersection so that strings 22 would not protrude out of grooves 30. However, the increased depth of grooves 30 would have a greater effect on the integrity of casing 14. Alternatively, if the depth of grooves 30 is not increased, overlapping strings 22 would protrude outside grooves 30 thereby increasing the risk of being damaged.

Exemplary arrangements of strings 22 are now described. In general, the description of an arrangement of strings 22 is applicable to an arrangement of grooves 30 as strings 22 are received in grooves 30. In other words, a string 22 and a corresponding groove 30 follow substantially the same path.

Referring to FIGS. 3-7, casings 14 are shown in an unrolled or flattened condition to illustrate arrangements of strings 22. In other words, axial position z is plotted on the vertical axis and radial position rα is plotted on the horizontal axis.

Generally described, each casing 14 is wrapped with strings 22 that wind substantially helically at least partially along the axial length of casing 14. At least one of strings 22 includes a series of segments S that are arranged at different inclinations or wrap angles θ. The illustrated wrap angles θ are measured with respect to x-y planes that are represented by notional dotted lines although equivalent alternative formulations can be achieved by changing the reference plane used to measure wrap angles θ.

Segments S are arranged at wrap angles θ such that, as segments S are wrapped around casing 14, segments S longitudinally ascend an axial distance L along the axial length of casing 14 and transversely extend an arc distance C around the circumference of casing 14.

As mentioned above, wrap angle θ can be selected according to a range of strains that system 20 is likely to encounter or designed to measure. The lengths of segments S may then be selected in any manner so long as strings 22 do not intersect and overlap one another. Exemplary methods for selecting the lengths of segments S are now described. As described in further detail below, the selection of the lengths of segments S facilitates qualitative and quantitative analysis of wavelength responses $\lambda_n$.

Arrangements of Strings

Figure 3:
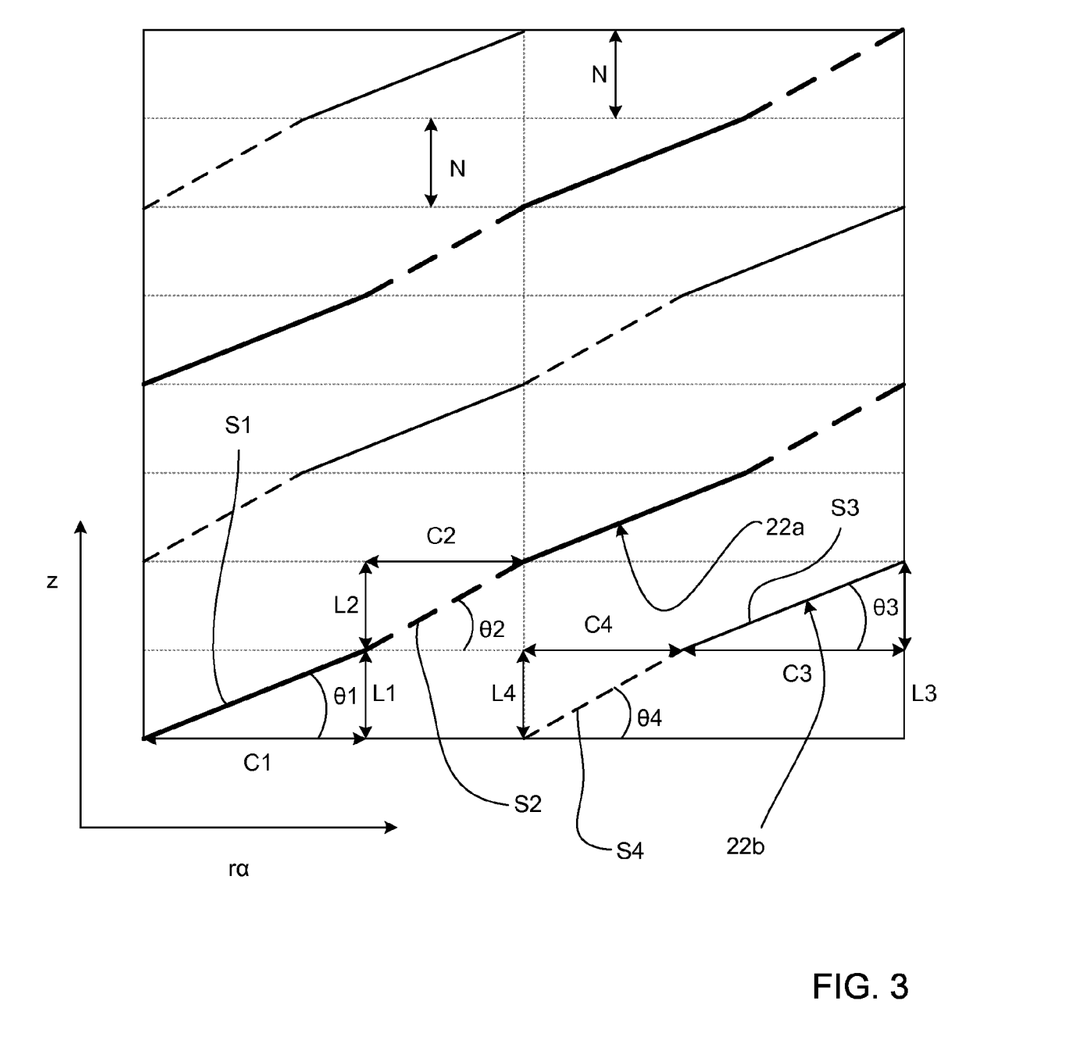
FIGS. 3-7 illustrate exemplary arrangements of strings of the system of FIG. 2.
Figure 4:
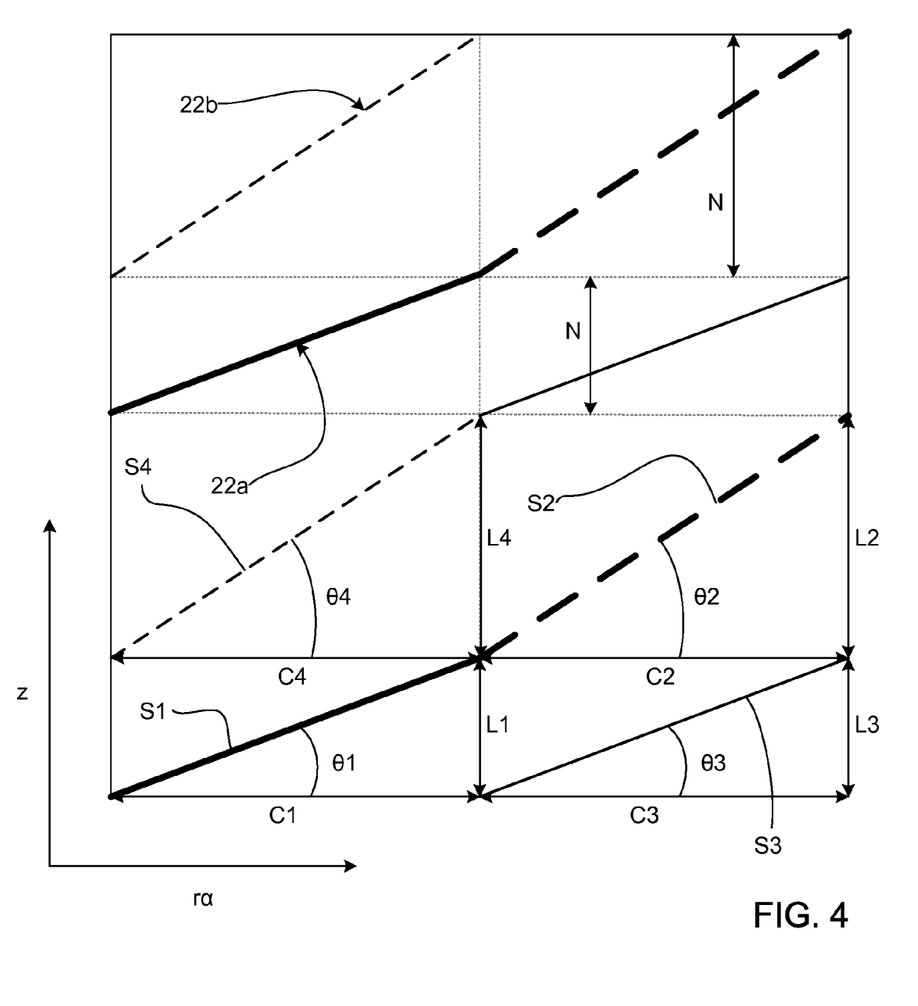

Referring to FIGS. 3 and 4, the illustrated arrangements include first string 22a and second string 22b where first string 22a has a repeating series of segments $S_1$, $S_2$ and string 22b has a repeating series of segments $S_3$, $S_4$. Strings 22a, 22b are substantially similar to one another as segments $S_1$, $S_3$ have substantially the same length and wrap angle θ and segments $S_2$, $S_4$ have substantially the same length and wrap angle θ. Specifically, wrap angle $\theta_1$ is substantially equal to wrap angle $\theta_3$ and wrap angle $\theta_2$ is substantially equal to wrap angle $\theta_4$.

The difference in position of strings 22a, 22b relative to one another, generally referred to herein as phase, is selected such that the strings do not intersect. Phase can be indicated by the distance and direction between reference points p on strings 22. Reference points p may be selected where a series of segments S begins or ends or at a meeting point of segments S. For example, referring to FIG. 3, a reference point p on first string 22a and a corresponding reference point p on second string 22b have different axial positions z and radial positions rα. Referring to FIG. 4, a reference point p on first string 22a and a corresponding reference point p on second string 22b have the same axial position z and different radial positions rα.

For clarity, in FIGS. 3 and 4, first string 22a is illustrated as a relatively thicker line, second string 22b is illustrated as a relatively thinner line, segments $S_1$, $S_3$ are illustrated as solid lines, and segments $S_2$, $S_4$ are illustrated as dashed lines.

Referring to FIG. 3, lengths of segments $S_1$, $S_2$, $S_3$, $S_4$ are selected such that axial distances $L_1$, $L_2$, $L_3$, $L_4$ are substantially the same and equal to constant distance intervals N measured along the axial length of casing 14. Phase is selected such that segments $S_1$, $S_4$ are represented within every other distance interval N and segments $S_2$, $S_3$ are represented within other distance intervals N.

Figure 8:
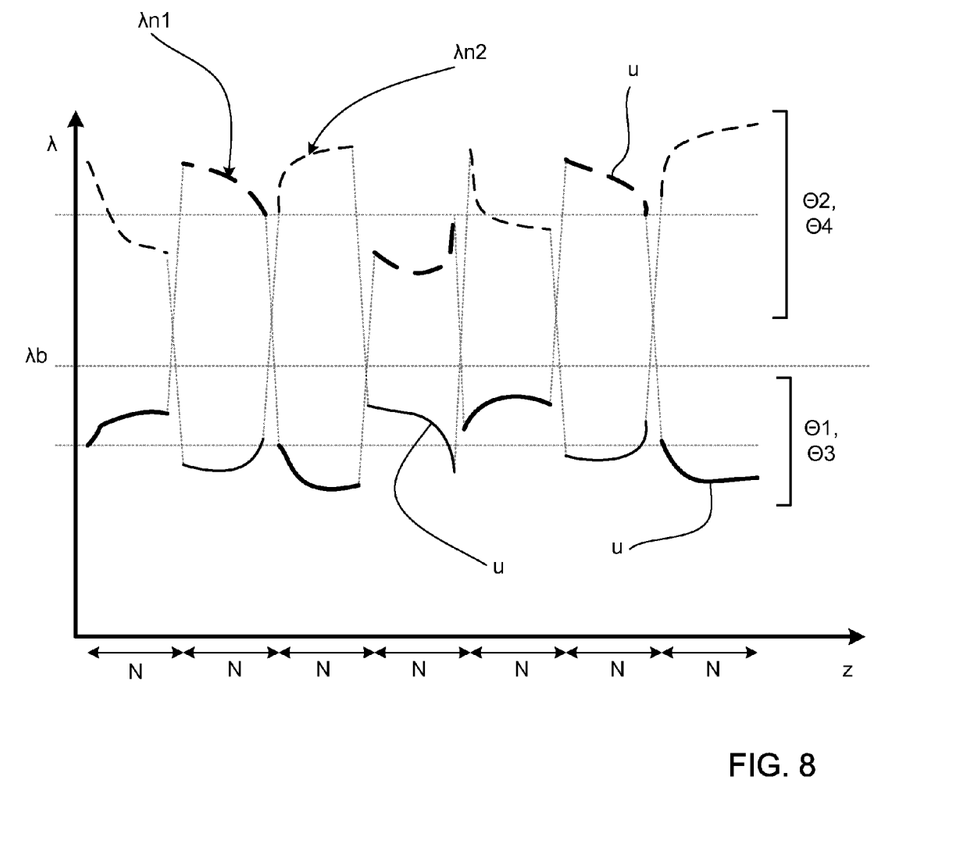
FIG. 8 is a graph illustrating signals relating to the arrangement of strings shown in FIG. 3.

As described in further detail below, when wavelength responses $\lambda_n$ of both strings 22a, 22b are plotted on the same graph with respect to axial position z, subsets u of wavelength responses $\lambda_n$ can be grouped according to wrap angle θ such that a group of subsets u represents a substantially continuous series of measurements along the axial length of casing 14 for one wrap angle θ value. Referring momentarily to FIG. 8, for the arrangement of FIG. 3, subsets u of wavelength responses $\lambda_{n1}$, $\lambda_{n2}$ that correspond to wrap angles $\theta_1$, $\theta_3$ can be combined and subsets of wavelength responses $\lambda_{n1}$, $\lambda_{n2}$ that correspond to wrap angles $\theta_2$, $\theta_4$ can be combined.

Referring to FIG. 4, lengths of segments $S_1$, $S_2$, $S_3$, $S_4$ are selected such that arc distances $C_1$, $C_2$, $C_3$, $C_4$ are substantially the same. Specifically, each arc distance $C_1$, $C_2$, $C_3$, $C_4$ is substantially half of the circumference of casing 14.

Phase is selected such that segments $S_1$, $S_3$ are represented within every other distance interval N and segments $S_2$, $S_4$ are represented within other intervals N. Here, distance intervals N change in length in an alternating manner according to different axial distances $L_1$, $L_2$, $L_3$, $L_4$.

Figure 9:
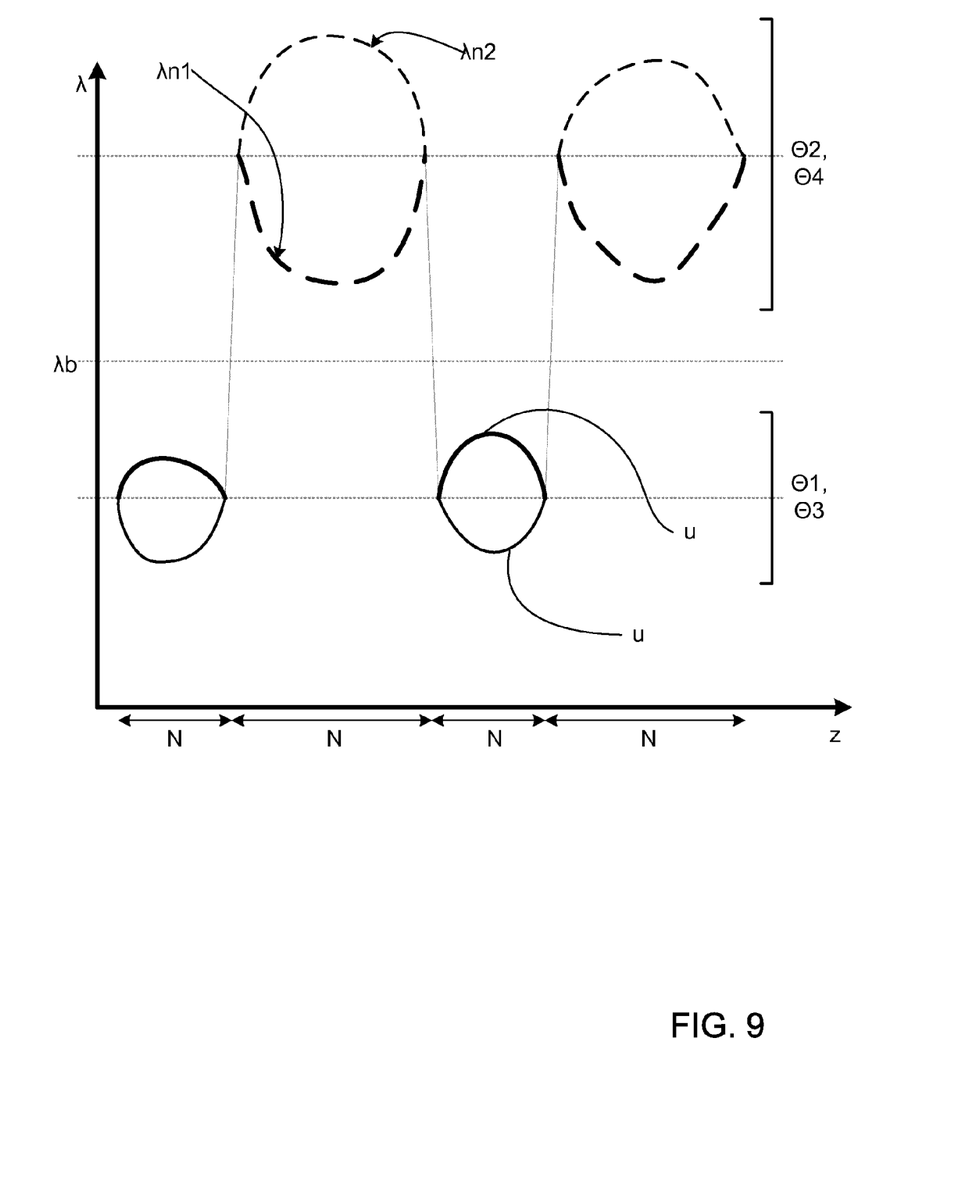
FIG. 9 is a graph illustrating signals relating to the arrangement of strings shown in FIG. 4.

Referring momentarily to FIG. 9, for the arrangement of FIG. 4, subsets u of wavelength responses $\lambda_{n1}$, $\lambda_{n2}$ that correspond to wrap angles $\theta_1$, $\theta_3$ can be combined and subsets u of wavelength responses $\lambda_{n1}$, $\lambda_{n2}$ that correspond to wrap angles $\theta_2$, $\theta_4$ can be combined. Here, the groups of subsets u are interrupted and only partially represented along the axial length of casing 14 but effectively measure around the entire circumference of casing 14.

In alternative embodiments, the lengths of segments $S_1$, $S_2$, $S_3$, $S_4$ can be constrained so as to be substantially equivalent.

Figure 5:
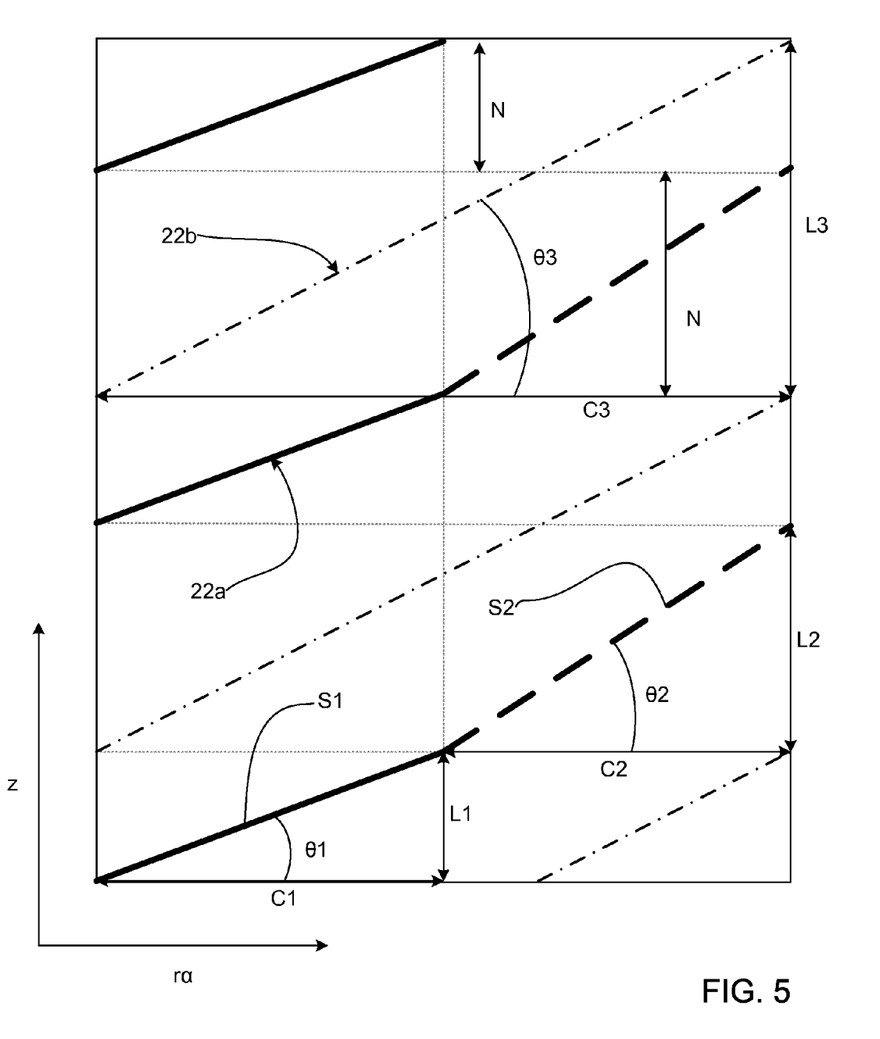
Figure 6:
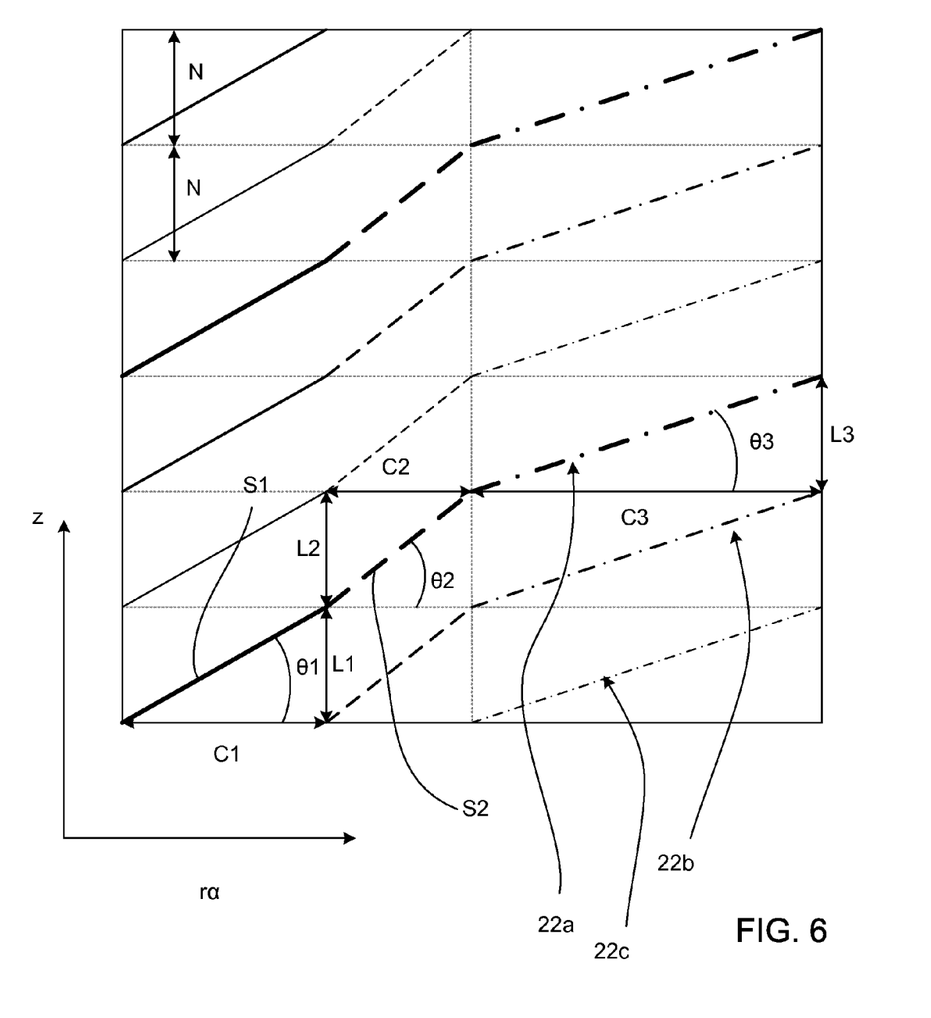
Figure 7:
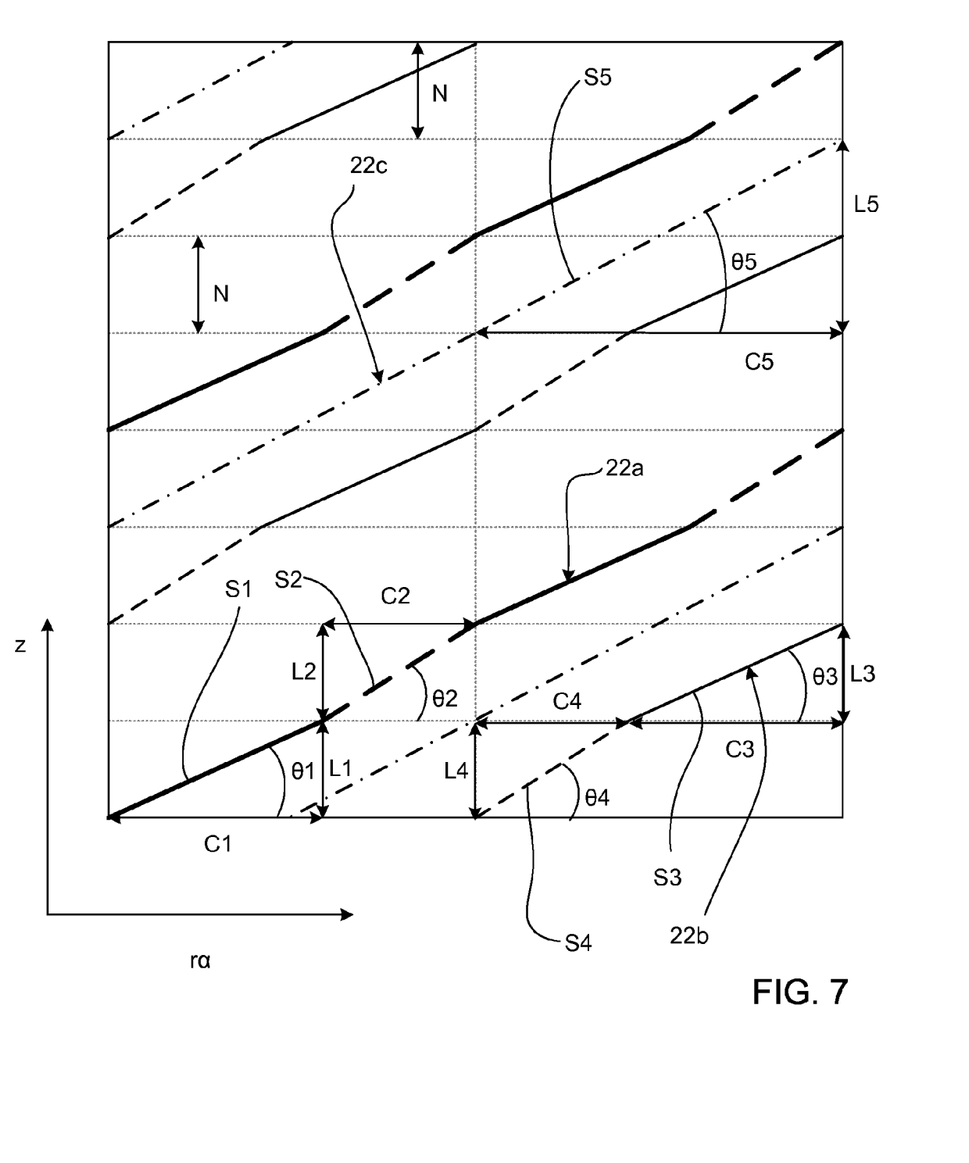

The teachings of the present disclosure are not limited to a system having two strings 22 where each string 22 is arranged to include two wrap angles $\theta$. Referring to FIGS. 5-7, embodiments of system 20 are described that include at least two strings 22 where at least one of strings 22 is arranged to include inclinations of at least two wrap angles $\theta$.

Referring to FIG. 5, system 20 includes first string 22a and second string 22b. Here, string 22a has a repeating series of segments $S_1$, $S_2$ with different wrap angles $\theta_1$, $\theta_2$. String 22b has a substantially constant wrap angle $\theta_3$ although, for purposes of teaching, string 22b is described as a series of segments $S_3$ that have the same wrap angle $\theta_3$.

Segments $S_1$, $S_2$ extend axial distances $L_1$, $L_2$ and arc distances $C_1$, $C_2$ that are determined by the lengths of segments $S_1$, $S_2$ wrap angles $\theta_1$, $\theta_2$. String 22b has wrap angle $\theta_3$ where notional segments $S_3$ extend an axial distance $L_3$ that is substantially equal to the sum of axial distances $L_1$, $L_2$ and extend an arc distance $C_3$ that is substantially equal to the sum of arc distances $C_1$, $C_2$. String 22a effectively varies about a constant angle of inclination along the length thereof and the constant angle of inclination is substantially equal to wrap angle $\theta_3$. Strings 22a, 22b are therefore approximately parallel to one another although phased such that variations of string 22a from a parallel path do not cause strings 22a, 22b to intersect one another.

Referring to FIG. 6, system 20 includes three strings 22a, 22b, 22c and each string 22a, 22b, 22c includes the same series of segments $S_1$, $S_2$, $S_3$ although, for simplicity, only string 22a is labeled. Similar to the arrangement of FIG. 3, lengths of segments $S_1$, $S_2$, $S_3$ such that axial lengths $L_1$, $L_2$, $L_3$ are substantially the same. Strings 22a, 22b, 22c are phased such that reference points p on strings 22a, 22b, 22c have different axial positions z and the same radial position $r\alpha$.

The previously described arrangements of FIGS. 3-5 can include additional strings 22 arranged at one or more wrap angles. For example, referring to FIG. 7, string 22c is added to the arrangement of FIG. 3. Here, string 22c has a substantially constant wrap angle $\theta_5$ that can be determined as described for wrap angle $\theta_3$ for the arrangement of FIG. 5.

Relationship Between Change in Wavelength and Strain

An equation that may be used to relate change in wavelength $\Delta\lambda$ and fiber strain $\epsilon f$ imposed on sensors 24 is given by $\Delta\lambda = \lambda_b(1-\text{Pe})K\epsilon_f$. As an example, Bragg wavelength $\lambda_b$ may be approximately 1560 nanometers. The term $(1-P_e)$ is a fiber response which, for example, may be 0.8. Bonding coefficient K represents the bond of sensor 24 to casing 14 and, for example, may be 0.9 or greater.

The fiber strain $\epsilon_f$ may be associated with strain at a sensor 24 position on casing 14 according to $$\varepsilon_f = -1 + \sqrt{\sin^2\theta \cdot \left(1 - \left(\varepsilon_a - \frac{r\cos\phi}{R}\right)\right)^2 + \cos^2\theta \cdot \left(1 + v\left(\varepsilon_a - \frac{r\cos\phi}{R}\right)\right)^2}$$

Fiber strain $\epsilon_f$ measured by sensor 24 at a position on casing 14 is a function of axial strain $\epsilon_a$ at the position, radius of curvature R at the position, Poisson's ratio v, wrap angle $\theta$ of segment S on which sensor 24 is located, and radial position which is represented in the equation by radius r and reference angle $\phi$. Fiber strain $\epsilon_f$ is measured, wrap angle $\theta$ is known, and radius r is known. Poisson's ratio v is typically known for elastic deformation of casing 14 and unknown for non-elastic deformation of casing 14. Radius of curvature R, reference angle $\phi$, and axial strain $\epsilon_a$ are typically unknown and are determined through analysis of wavelength response $\lambda_n$. Similarly, Poisson's ratio v can be determined through analysis of wavelength response $\lambda_n$ where Poisson's ratio v is unknown.

Analysis of Wavelength Response

Referring to FIGS. 8-11, wavelength responses $\lambda_n$ of strings 22 are plotted on the same graph. These measurements represent fiber strain $\epsilon_f$ measurements made at each sensor 24 by system 20. Here, wavelength responses $\lambda_n$ are plotted with respect to axial positions z of sensors 24 or along the longitudinal axis of casing 14.

As mentioned above, each reflected wavelength $\lambda_r$ of wavelength response $\lambda_n$ is substantially equal to Bragg wavelength $\lambda_b$ plus change in wavelength $\Delta\lambda$. As change in wavelength $\Delta\lambda$ is dependent on wrap angle $\theta$, a shift in wavelength response $\lambda_n$ (tracked by dotted lines) is observed where sensors 24 in series are on segments S that are arranged at different wrap angles $\theta$. For example, a shift is observed approximately at axial positions z where segments S interface. As previously mentioned, subsets u of wavelength responses $\lambda_n$ that correspond to one wrap angle $\theta$ can be grouped together to effectively provide information that would be provided by a string 22 wrapped at a single wrap angle $\theta$.

Generally described, in response to axial strain $\epsilon_a$ on casing 14, wavelength response $\lambda_n$ is typically observed as a constant (DC) shift from Bragg wavelength $\lambda_b$. In response to bending of casing 14 that corresponds to a radius of curvature R, wavelength response $\lambda_n$ is typically observed as a sinusoid (AC). A change in Poisson's ratio v modifies both the amplitude of the axial strain $\epsilon_a$ shift and the amplitude of the sinusoids. In any case, signal processing can be used to determine axial strain $\epsilon_a$, radius of curvature R, reference angle $\phi$, and Poisson's ratio v at sensor 24 positions. Examples of applicable signal processing techniques include inversion where a misfit is minimized and turbo boosting. The signal processing method can include formulating wavelength response $\lambda_n$ for one wrap angle as the superposition of a constant shift and a sinusoid.

FIG. 8 represents exemplary wavelength responses $\lambda_{n1}$, $\lambda_{n2}$ measured by system 20 where strings 22a, 22b are arranged as shown in FIG. 3. Here, wavelength responses $\lambda_1$, $\lambda_2$ are unique for axial strain $\epsilon_a$, radius of curvature R, and Poisson's ratio v.

FIG. 9 represents exemplary wavelength responses $\lambda_{n1}$, $\lambda_{n2}$ measured by system 20 where strings 22a, 22b are arranged as shown in FIG. 4. Here, wavelength responses $\lambda_{n1}$, $\lambda_{n2}$ are unique for radius of curvature R. Specifically, subsets u within one of distance intervals N spread apart with decreasing radius of curvature R.

Figure 10:
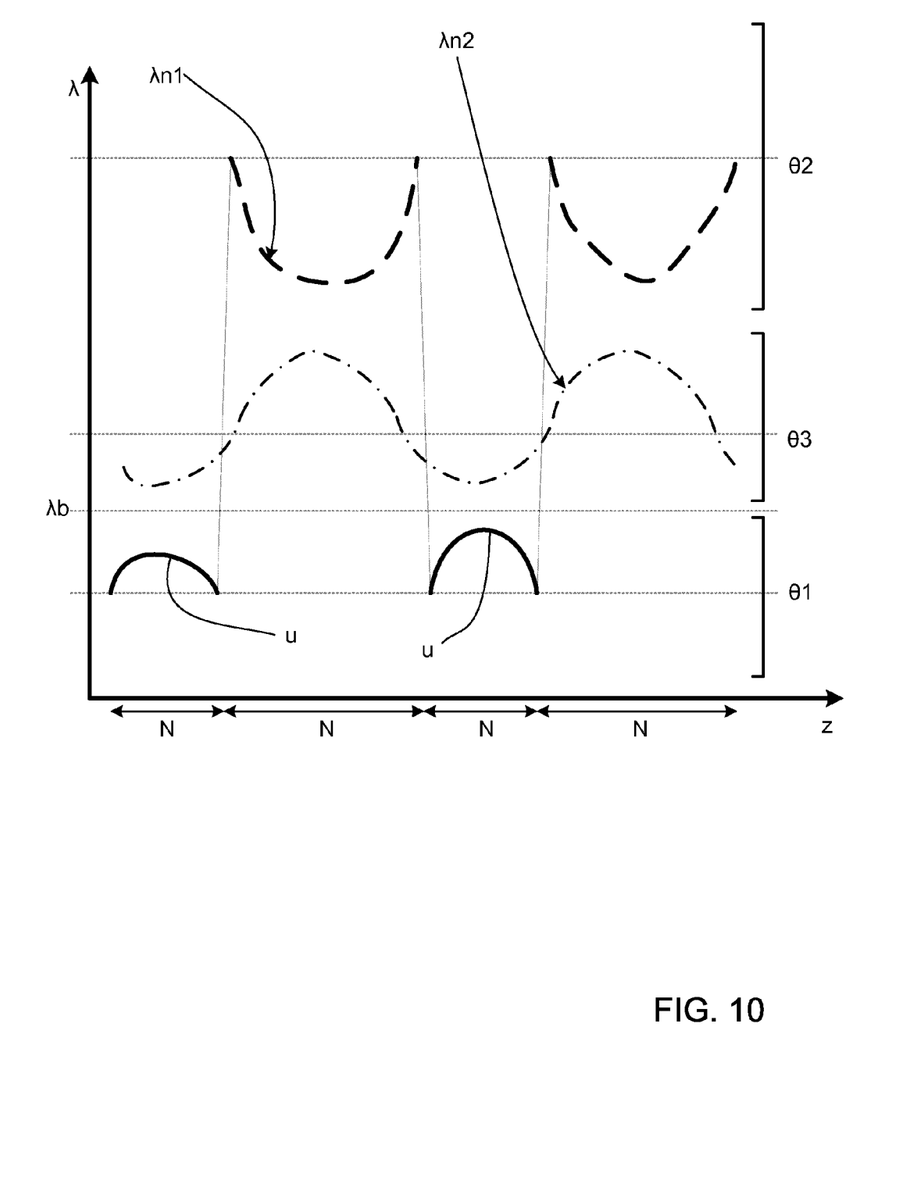
FIG. 10 is a graph illustrating signals relating to the arrangement of strings shown in FIG. 5.

FIG. 10 represents exemplary wavelength responses $\lambda_{n1}$, $\lambda_{n2}$ measured by system 20 where strings 22a, 22b are arranged as shown in FIG. 5. As wrap angle $\theta$ of string 22b is substantially constant, there is no shift due to change in wrap angle $\theta$.

Figure 11:
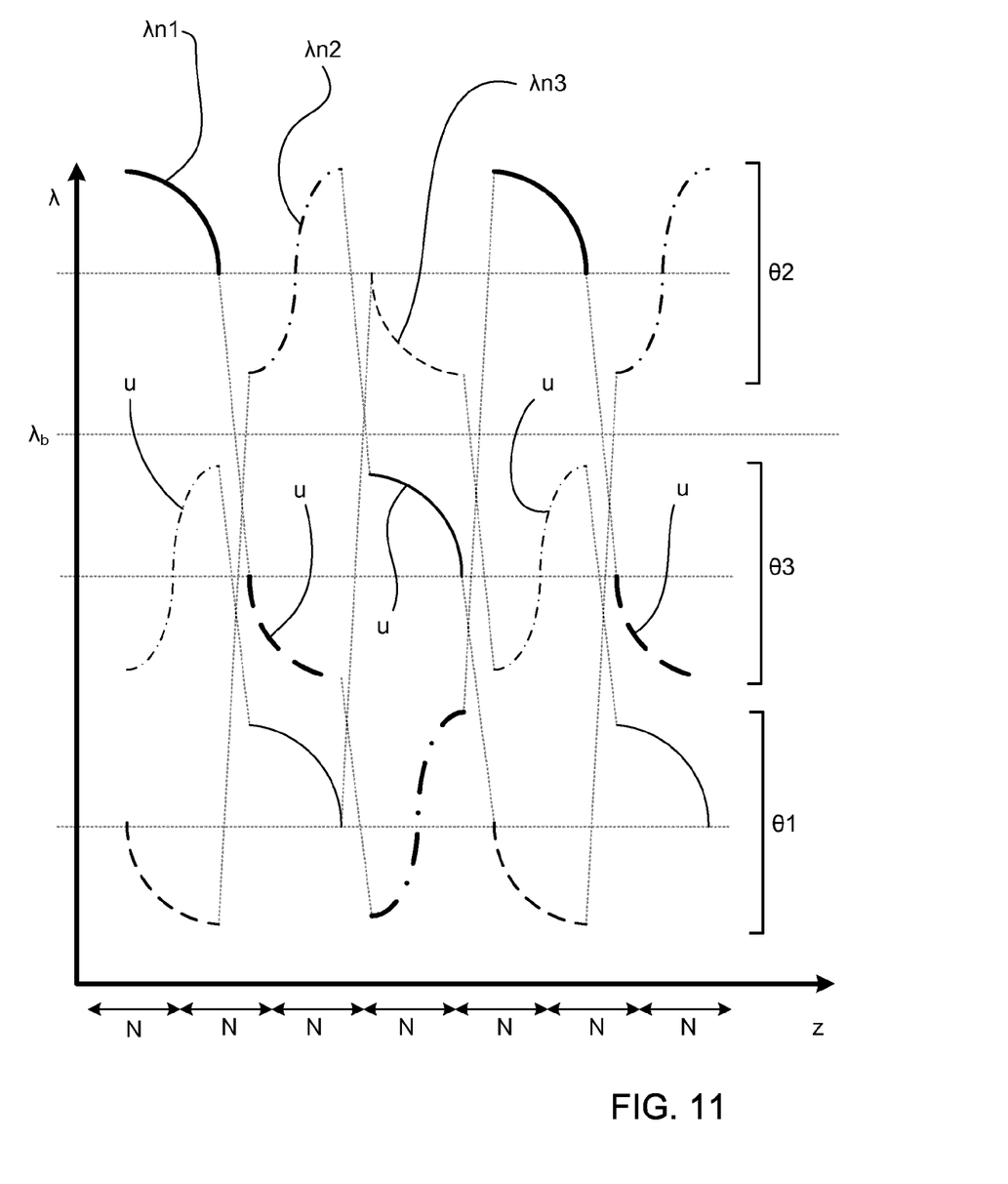
FIG. 11 is a graph illustrating signals relating to the arrangement of strings shown in FIG. 6.

FIG. 11 represents exemplary wavelength responses $\lambda_{n1}$, $\lambda_{n2}$, $\lambda_{n3}$ measured by system 20 where strings 22a, 22b, 22c are arranged as shown in FIG. 6. The result is similar to that of FIG. 8 however this arrangement provides three groups of subsets u corresponding to three different wrap angle $\theta$ values.

The law does not require and it is economically prohibitive to illustrate and teach every possible embodiment of the present disclosure. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method of imaging deformation of a cylindrical object in a borehole, comprising:
   (a) providing at least two strings of interconnected sensors that are wrapped around an axial section of the cylindrical object so as not to intersect one another along said axial section, at least one of the at least two strings comprising a series of at least two segments (S), the series of at least two segments comprising:
      a first segment (S) arranged at a first angle ($\theta 1$) with respect the cylindrical object axis; and
      a second segment (S) arranged at a second angle ($\theta 2$) with respect to the cylindrical object axis;
   b) measuring an amount of strain at a plurality of positions within said axial section of the cylindrical object, by:
      receiving signals from the at least two strings of interconnected sensors
   b) determining the deformation of the cylindrical object within said axial section from the strain measurements by processing the received signals so as to determine the Poisson's ratio at the sensor positions; and
   c) projecting an image of the deformed cylindrical object.

2. The method according to claim 1 wherein the signals in step a) are received from sensors positioned on a portion of the cylindrical object that has been non-elastically deformed.

3. The method according to claim 1 wherein step b) includes formulating a wavelength response $\lambda_n$ for at least one wrap angle as the superposition of a constant shift and a sinusoid.

* * * * *